United States Patent [19]

Roch

[11] Patent Number: 4,504,096

[45] Date of Patent: Mar. 12, 1985

[54] SELF-ADJUSTING GIB FOR MACHINE TOOLS AND THE LIKE

[75] Inventor: Gerald V. Roch, Indianapolis, Ind.

[73] Assignee: Hurco Manufacturing Co., Inc., Indianapolis, Ind.

[21] Appl. No.: 462,133

[22] Filed: Jan. 28, 1983

[51] Int. Cl.³ .............................................. F16C 23/02
[52] U.S. Cl. ...................................... 308/3 A; 29/1 A; 408/234
[58] Field of Search .............. 308/3 R, 3 A, 6 R, 6 C; 29/1 A, 149.5 NM; 408/234; 409/145, 241, 343

[56] References Cited

U.S. PATENT DOCUMENTS

| | | | |
|---|---|---|---|
| 1,555,055 | 9/1925 | Cardullo | 409/343 |
| 1,813,355 | 7/1931 | Lucas | 409/343 |
| 1,835,328 | 12/1931 | Parsons | 409/219 |
| 1,917,926 | 7/1933 | Decker | 308/3 A |
| 1,958,507 | 5/1934 | Archea | 409/154 |
| 2,049,891 | 8/1936 | Carlton | 408/237 |
| 2,111,332 | 3/1938 | Roehm | 409/101 |
| 2,123,825 | 7/1938 | DeVlieg | 409/206 |
| 2,263,404 | 11/1941 | Armitage et al. | 29/26 R |
| 2,293,880 | 8/1942 | Armitage et al. | 409/183 |
| 2,307,238 | 1/1943 | Ross | 51/95 GH |
| 3,198,588 | 8/1965 | Cashman et al. | 308/6 R |
| 3,220,782 | 11/1965 | McCabe | 308/3 R |
| 3,619,013 | 11/1971 | Jones | 308/3 A |

FOREIGN PATENT DOCUMENTS 1045739 12/1958 Fed. Rep. of Germany ..... 308/3 A

*Primary Examiner*—John Petrakes
*Assistant Examiner*—David Werner
*Attorney, Agent, or Firm*—Woodard, Weikart, Emhardt & Naughton

[57] ABSTRACT

A machine tool bed has guideway rails. A slide is mounted to the rails and has gib blocks spaced along the length of the slide and engaging the rails. The gib blocks are spring loaded to maintain them engaged with the guide rails at all times to provide zero-clearance between gibs and rails. The gib blocks are provided with backing surfaces at self-locking angles such as to avoid displacement of the gib blocks under loading, and maintain constant zero-clearance.

17 Claims, 9 Drawing Figures

SELF-ADJUSTING GIB FOR MACHINE TOOLS AND THE LIKE

BACKGROUND OF THE INVENTION

1. Field of the Invention

This invention relates generally to machine tools, and more particularly to an improved means for supporting and guiding two components thereof during sliding movement of one on the other.

2. Description of the Prior Art

In prior art machine tools, one mounting technique commonly used has been to provide parallel guideway bars bolted to one part of the machine tool (the bed, for example) and gib rails fastened to a slide (worktable, for example). Shims or wedges have been secured between the gib rails and the slide for periodic adjustment to compensate for wear and avoid looseness.

Other slide and guide arrangements are known.

The U.S. Pat. No. 1,835,328 to Parsons, shows a knee-type milling machine. Gib 14 is said to be tapered. There is an adjusting screw 14a (FIGS. 2 and 4) whereby the gib is adjusted to fit closely between the opposed surfaces throughout its length, but loose enough to permit the saddle to slide. Similarly, a tapered gib 20 and adjusting screw 15a are provided.

A U.S. Pat. No. 1,917,926 to Decker mentions some prior art techniques intended to avoid the necessity for frequent and careful screw adjustment of gibs to take up the wear and play between the parts. It mentions springs and plungers spaced along a gib, and proposes a continuous spring as a preferred solution.

There remains a need for a self-adjusting gib which is inexpensive, resistant to displacement under heavy or shock loads or vibrations while, nevertheless, accommodating the desired sliding movement without undue resistance. The present invention is directed to meeting this need and has these advantages over the prior art known to me.

SUMMARY OF THE INVENTION

Described briefly, according to a typical embodiment of the present invention, a support unit having first and second guides which are parallel and spaced from each other, receives thereon a slide unit. The slide unit has gib means thereon, at least one of which has bearing surface means engaging a guide face of one of the guides. The one gib means has backing surface means inclined relative to the guide face engaged by the gib means, with the incline being at an angle which resists displacement of the one gib means as a result of any load applied perpendicular to the bearing surface thereof in contact with the guide face. Means are provided to urge the bearing surface of the one gib means against the guide face to maintain zero clearance in the system of gib means and guides.

DESCRIPTION OF THE PREFERRED EMBODIMENT

Figure 1:
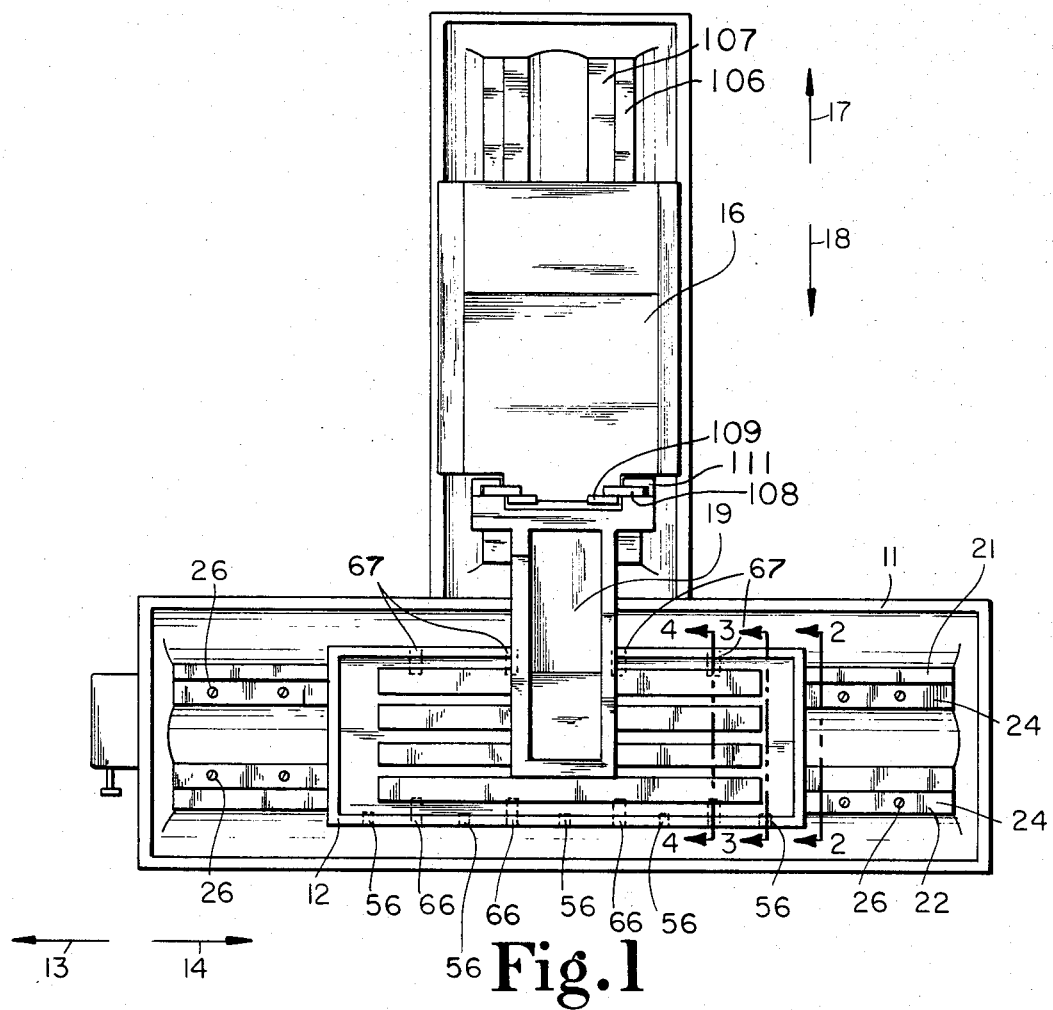
FIG. 1 is a top plan view of a milling machine having carriages employing self-adjusting gibs according to a typical embodiment of the present invention.
Figure 2:
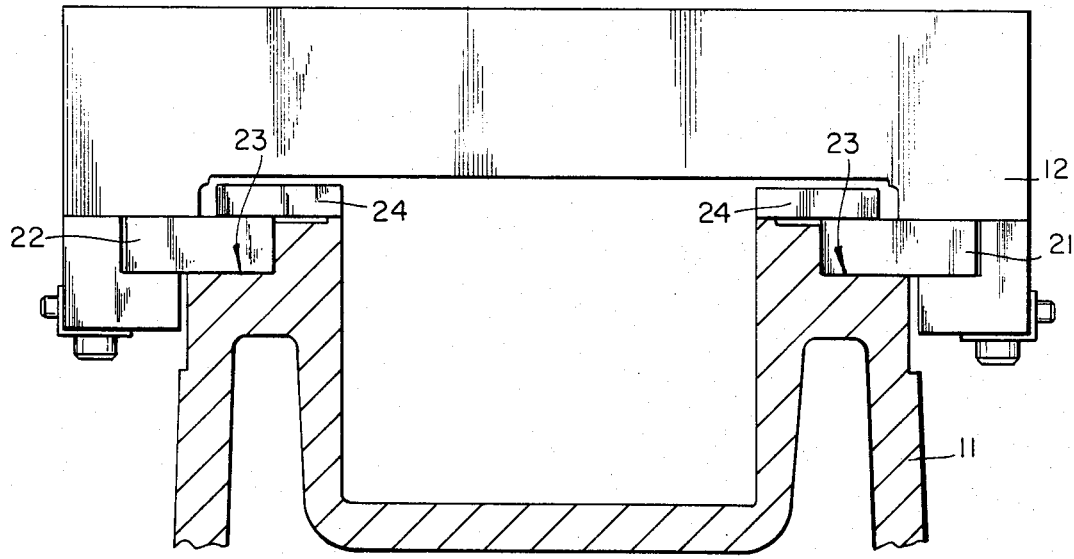
FIG. 2 is an enlarged fragmentary sectional view taken at lines 2-2 in FIG. 1 and showing some details of the worktable guiding system.
Figure 4:
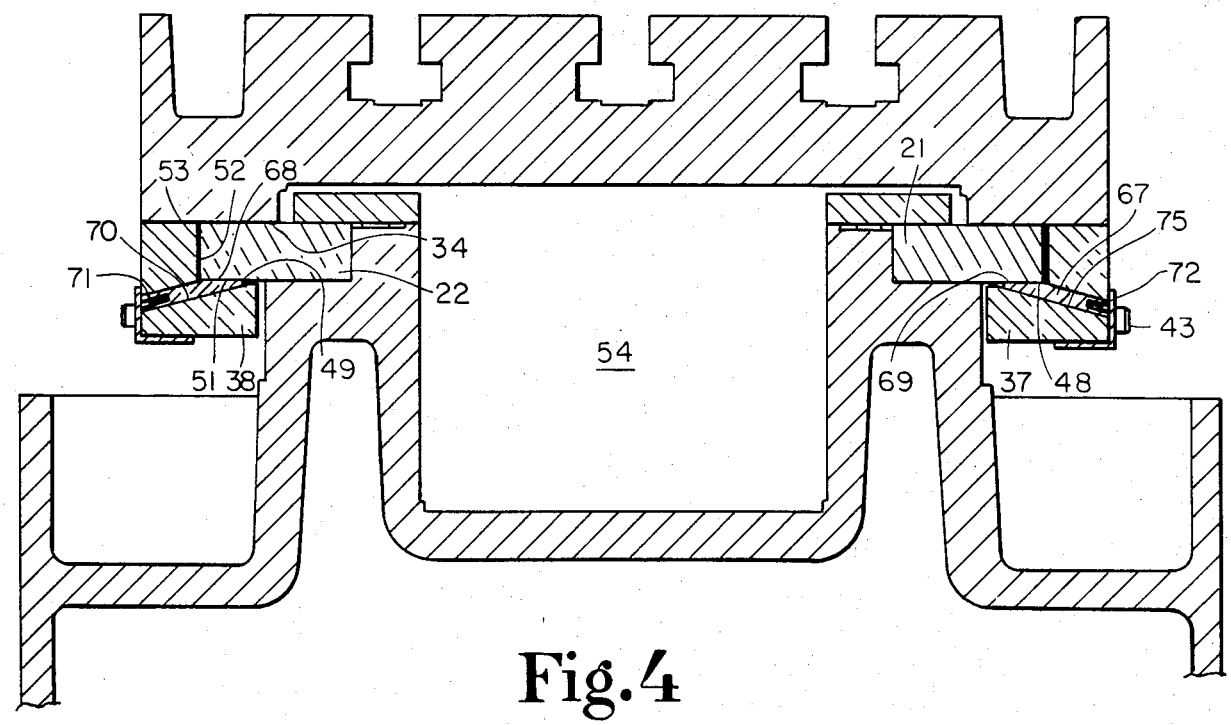
FIG. 4 is a fragmentary section taken at line 4-4 in FIG. 1 and showing details of gibs for vertical confinement.

Referring now to the drawings in detail, and particularly to FIGS. 1 and 4, the illustrated machine tool is a bed-type milling machine. It is used only as an example, as the present invention can be incorporated on a variety of types of machines and equipment. In the illustrated embodiment, the machine has a generally T-shaped bed 11 and a workpiece mounting table 12 which is movable in the X-axis direction of arrows 13 and 14. A column 16 is also mounted on the bed and is movable in the Y-axis direction of arrows 17 and 18. A spindle mounting head 19 is mounted on the column and is movable in the Z-axis (vertical) direction. The self-adjusting gibs of the present invention are applicable to the mounting of table to bed, column to bed, and head to column. A description of one will suffice for all.

Figure 3:
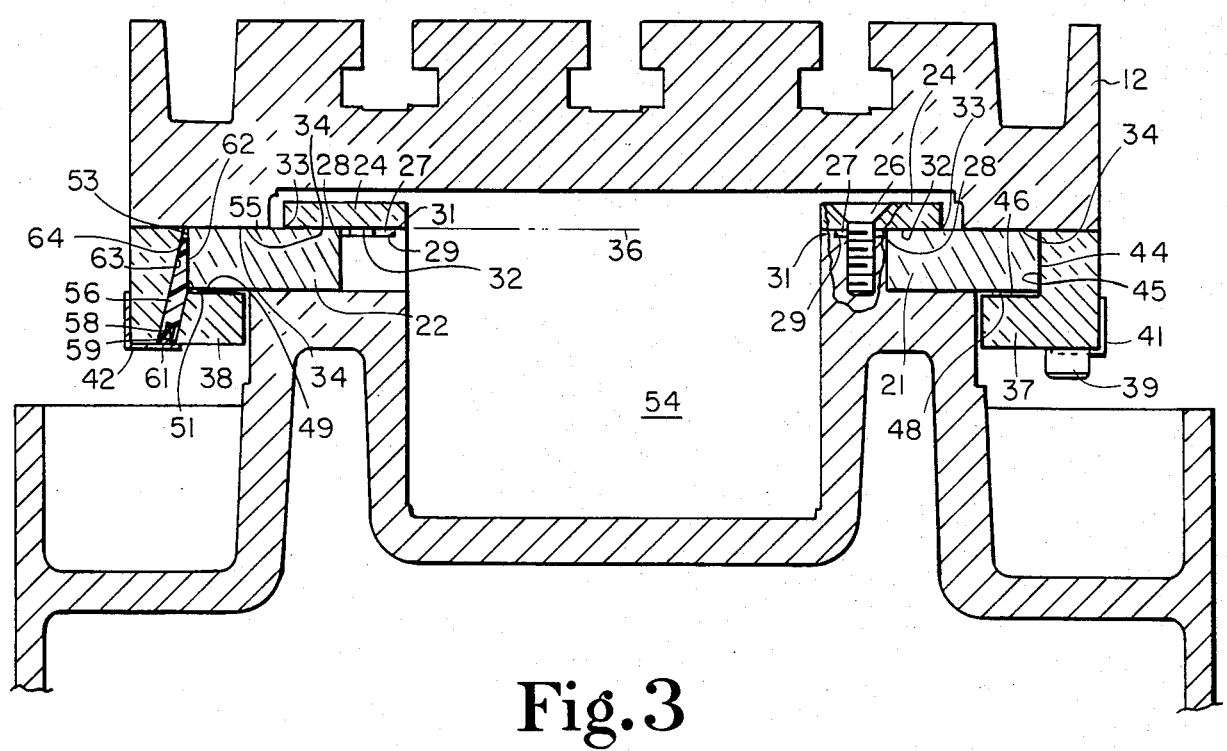
FIG. 3 is a further enlarged fragmentary section taken at line 3-3 in FIG. 1 and showing details of the gib for horizontal confinement.
Figure 5:
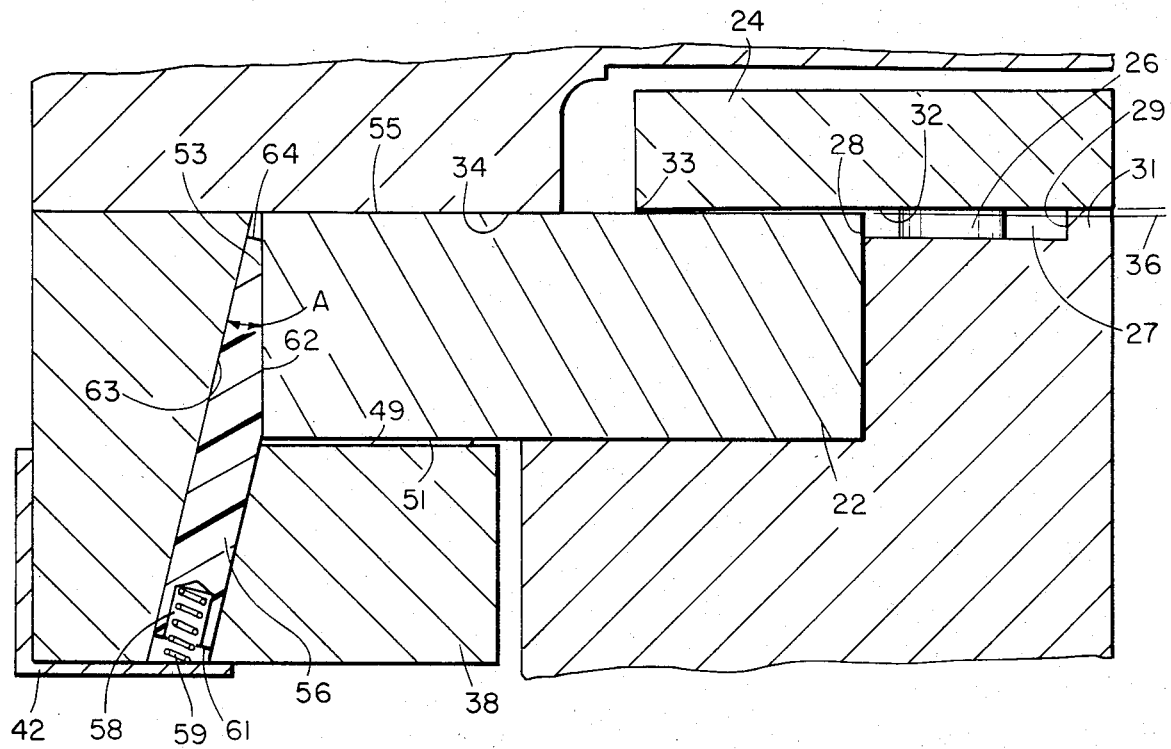
FIG. 5 is an enlargement of a portion of FIG. 3.

The table 12 is mounted on the bed 11 in a manner incorporating a typical embodiment of the present invention. For this purpose, guideways are provided in the form of a pair of rails 21 and 22. Each of these is received in a longitudinally extending groove such as 23 in the top of the bed. Each is secured in the groove by clamp 24, each of which is secured to the bed by a plurality of longitudinally spaced flat headed screws 26 threadedly received in the bed. As best shown in FIGS. 3 and 5, there is a relief space 27 defined by four walls. The bottom wall of the space is the top of the bed extending inward from the upper edge 28 of the bed groove 23 to a wall 29 of a longitudinally extending integral rib 31 of the bed, which serves as one side wall of the space. The other side wall of the space is the upper inner face of the guide rail. The top of the space is defined by the underside 32 of the clamp. Consequently, as the screws 26 are tightened, the clamp 24, bearing on the rib 31 of the bed at the inside edge, and bearing on the top of the guideway rail at the outer edge 33 of the clamp, serves to clamp the rail tightly in the groove 23 in the bed. As an example, the guideway rails may be made of hardened and ground steel bars 2 inches wide and 0.75 inches thick. The clamps 24 can be standard cold rolled flat steel stock 1.6 inches wide and 0.38 inches thick, with no special finish.

Referring to FIG. 3, the tops of the guideway rails 21 and 22 in the illustrated embodiment, are co-planar. They provide the support surfaces for the table 12, whose bearing faces 34 are supported and slide on the top guide faces of the guide rails 21 and 22. In the illustrated embodiment, these guide faces are co-planar in a plane 36, but this is not essential to the practice of the present invention. While referring to the plane 36, it should be mentioned that the integral ribs 31 (FIGS. 3 and 5) of the bed and which support the inner edges of the clamp rails are above the plane 36. In this instance, the amount is 0.015 inches, for example. Accordingly, the clamp rails are slightly canted as shown, so that the outer edges 33 thereof are in substantially line-contact with the tops of the guide rails 21 and 22, thus assuring absolutely certain downward bearing of the clamp rails on the guide rails so that the guide rails are securely fixed in their respective receiving grooves 23 in the bed.

Two L-shaped gib brackets 37 and 38 (FIG. 3) are secured to the table. This is done by a series of cap screws 39 spaced along the length of the table. These are threaded into the table and tightened against the brackets. Two gib spring retainers 41 and 42 are provided on the brackets 37 and 38, respectively. Like the brackets, they are of L-shaped cross section, but much thinner in section. They are secured to the brackets by screws such as 43, spaced along the length of the bracket and threaded into the bracket. Their horizontal flanges are notched as needed to accommodate the heads of screws 39.

Figure 6:
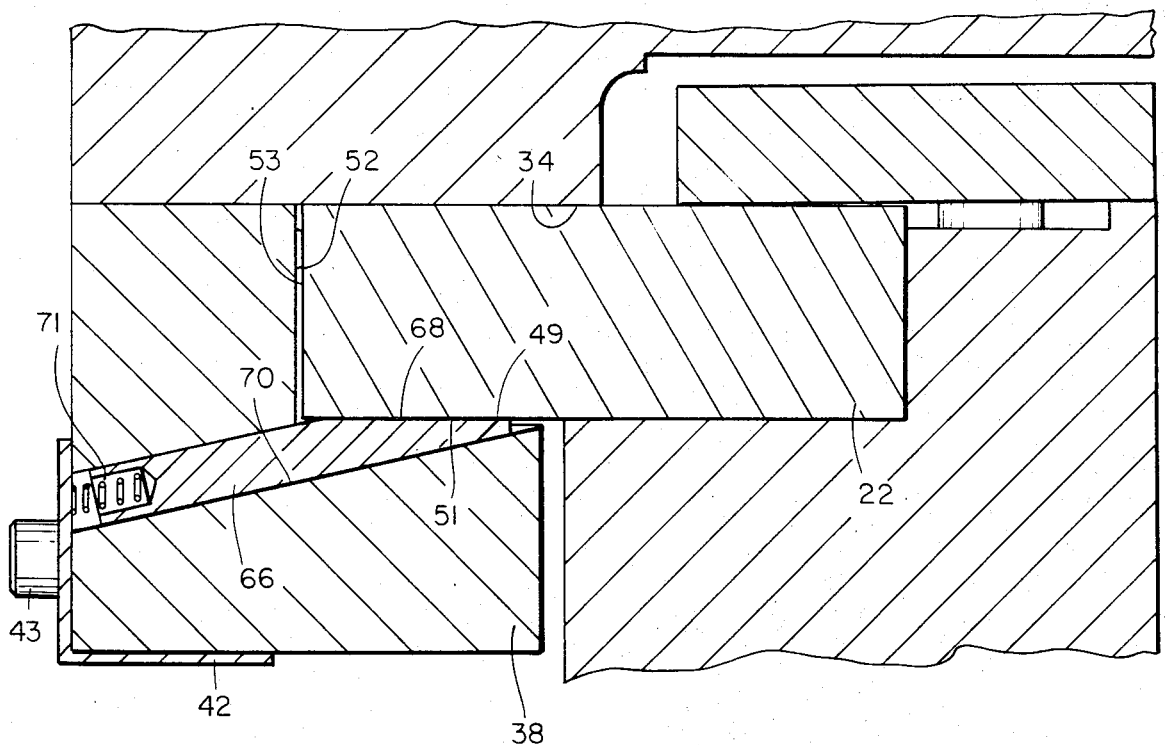
FIG. 6 is an enlargement of a portion of FIG. 4.

The inside face 45 of bracket 37 is flat and smooth and abuttingly engages the flat and smooth outside guide face 44 of the guide rail 21. The bracket 37, being L-shaped, has an inturned horizontal flange throughout its length. The flange top 46 on bracket 37 is spaced very slightly below the bottom guide face 48 of guide rail 21. The reason for this will become apparent. In like manner, the top face 49 of the inturned flange of bracket 38 is spaced slightly below the lower guide face 51 of guide rail 22. In contrast to the fit of the bracket 37 with the guide rail 21, the inside face 52 (FIGS. 4 and 6) of bracket 38 is spaced slightly outboard of the outside vertical guide face 53 of guide rail 22.

As thusfar described, one can see that the table is slidable horizontally along the rails 21 and 22 but, due to the vertical spacing between the bottoms of the guide rails and the tops of the gib brackets, some limited vertical movement of the table on the base could occur, particularly during machining operations on a workpiece mounted on the table. Also, because of the horizontal clearance between the vertical guide face 53 of the guide rail 22 and the vertical wall 52 of bracket 38, some horizontal displacement or yaw of the table with respect to the bed can occur during machining operations with the table stationary and during drive of the table along the rails by the X-axis drive assembly 54. The present invention is addressed to constantly providing zero clearance, to prevent the relative vertical and horizontal movements of the table with respect to the bed in all directions other than the desired X-axis sliding directions.

Figure 7:
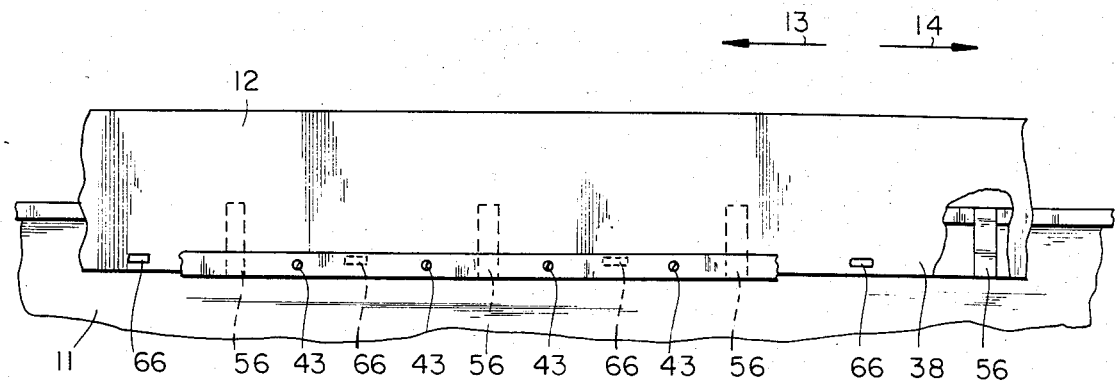
FIG. 7 is a fragmentary side elevational view of the milling machine of FIG. 1 illustrating one longitudinal arrangement of the gib blocks for the guideways for the workpiece mounting table.

To provide the horizontal guidance, gib blocks 56 (FIGS. 3, 5 and 7) are provided at spaced locations along the length of the bracket 38. These blocks may be made of a non-metallic material. An example is a "Nema" grade "LE" phenolic stock one inch wide and 0.188 inch thick. These blocks 56 are received in rectangular gib block receiving apertures through the bracket 38. These apertures begin at the bottom of the bracket and intercept the wall 52 from the top of the bottom flange to the top of the bracket. A close sliding fit is provided for the gib blocks in the apertures. A spring seat recess or cavity 58 (FIG. 5) is provided in the bottom of the block. A spring 59 seated in the upper end of the spring receiving cavity 58 extends out from the bottom 61 of the gib block and seats on the top of the horizontal flange of the spring retainer 42. This urges the gib block upward so that its bearing surface 62 which is smooth and flat, abuttingly engages the outside guide face 53 of guide rail 22. The gib block aperture has a flat back wall 63 which faces the guide rail guide face 53 when the gib block is out of the aperture. Wall 63 is inclined at an angle "A" with respect to the gib block bearing surface 62. For the self-locking purposes desired in accord with this invention, this angle should be 13° or less. In this way, no matter what horizontal force might be applied to the table relative to the bed as a result of machining or other operations, the gib block cannot be forced downward in the aperture. The upper end of the gib block at 64 is spaced sufficiently below the underside 34 of the table, that the gib block can move upwardly in the aperture under the urging of the spring to compensate for wear of the gib block during a period of use. Meanwhile, the loading of the spring on the gib block is sufficiently light (about 2 pounds) that, while it will keep the block engaged with the gib rail 22, and thereby keep the guide face 45 of bracket 37 slidingly engaged with the guide face 44 of guide rail 21 at all times, it will not so wedge the block as to interfere with the desired X-axis sliding of the table.

The material of which the gib block is made can be chosen to provide the best combination of minimal friction, minimal compression, and maximum endurance. The above example of material is just one of several possible choices. Removal of the gib blocks for replacement can be accomplished by removing the retainer screws 43 from the spring retainer rails, whereupon the gib loading springs and gibs can be removed from their apertures and recesses. Vibration and motion encountered in use of the machine allows the springs to feed the gib blocks inward when and as needed to compensate for wear.

Referring now to FIGS. 1, 4, 6, and 7, gib blocks 66 are provided in apertures in gib block bracket 38. Gib blocks 67 are provided in the bracket 37. Gib blocks 66 have smooth flat upwardly facing bearing surfaces 68 bearing on the underside guide face 51 of the guide rail 22. Likewise, the smooth flat bearing faces 69 of gib blocks 67 bear on the bottom guide face 48 of guide rail 21. These gib blocks are also spring loaded as at 71 for block 66 and 72 for block 67. Accordingly, these gib blocks are snugly engaged with the bottom faces of the guide rails 21 and 22, respectively, and maintain zero clearance between the top guide faces of these rails and the bottom of the table, despite exertion of upward forces on the table as a result of table movements along the X-axis or as the result of machining operations on a workpiece secured to the table, or as a result of other loads applied to the table. The backing surface 70 of the gib block aperture is inclined at a self-locking angle with respect to the bearing surfaces 68 of gib blocks 66 in the same manner as described above with reference to gib block 56, to provide the self-locking action. The same is true of the backing surfaces 75 for gib blocks 67. Yet, the spring load is low enough and the friction of the block material is low enough that freely sliding X-axis movement of the table on the rails is assured. Material and spring selections can be made to accommodate various sizes of machine, anticipated loads, and table drive system capacities.

The apertures can be provided in the gib bracket material by drilling or milling followed by electric discharge machine techniques for final shaping and sizing.

Figure 8:
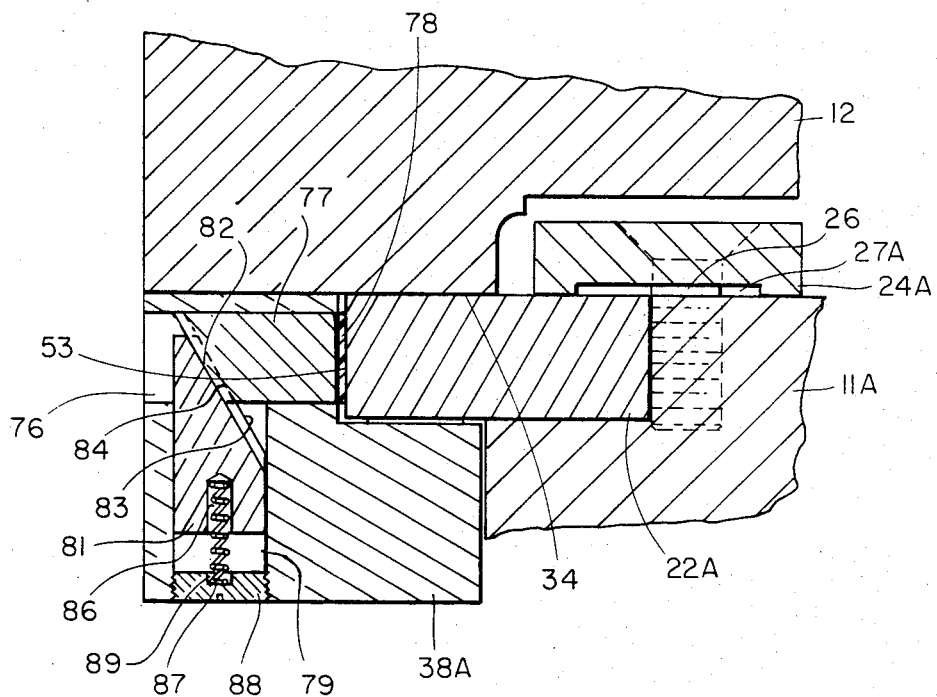
FIG. 8 is a fragmentary cross sectional view of a table employing self-adjusting gibs according to a second embodiment of the invention.

Referring now to FIG. 8, another embodiment of the present invention is shown. It is similar in many respects to the preferred embodiment previously described, but has some additional parts. In this illustration, the machine bed 11A is much the same as previously described. A guideway 22A is received in a longitudinally extending groove in the bed and is clamped in the groove by a clamp rail 24A. In this particular case, instead of the relief space 27 of the previous embodiment, a relief space 27A is provided in the clamp itself. The clamp is secured in the bed by a plurality of longitudinally spaced screws 26.

The table 12 has its lower face 34 running on the top guide face of the guide rail 22A. A gib bracket or frame 38A is fastened to the table in the same way as in the previous embodiment. However, the gib blocks are different and the apertures are differently oriented from those in the previous embodiment. The longitudinal spacing of the gibs for guiding horizontally and vertically is the same as described above for the preferred embodiment, so, upon further reference to FIGS. 8 and 9, it should be understood that the figures illustrate sections taken at the same relative location to a worktable as lines 3-3 and 4-4, respectively, in FIG. 1.

Referring further to FIG. 8, a round, horizontally extending aperture 76 is provided in gib frame 38A. A round gib block 77 is slidingly received in this aperture and has a non-metallic face pad 78 secured to its inner end, engaging the outer guide face 53 of the guideway rail. A round vertically extending aperture 79 is provided in the gib frame. A gib wedge block 81 is slidably received in this aperture. This wedge block has a beveled face 83 thereon with a central groove therein extending the length of this face, the bottom of the groove being at 82. Gib block 77 has a beveled face 84, with a central rib or tongue 85 therein received in the groove of the wedge block. Face 83 abuttingly engages face 84. Accordingly, even though the gib block and the gib wedge block are round, and face 83 can slide on face 84, the blocks will not rotate in their respective apertures because of the tongue-in-groove feature on the beveled faces thereof.

The wedge block 81 has a spring receiver cavity 86 therein receiving a coil spring 87 which seats in the cavity. A spring retainer cap 88 is threaded into the gib frame 38A at the lower end of the aperture receiving the gib wedge block. This cap has a recess 89 therein receiving the lower end of the spring.

The angle of the bevel 84 is a self-locking angle relative to the bearing face of face pad 78. The spring urges the wedge block against the gib block, thus urging the gib block against the guideway face 53 with the desired loading to maintain zero clearance on the opposite side of the bed and table as in the previously described embodiment. The self-locking angle prevents displacement of the gib block as a result of horizontal loading on the table. Yet the spring loading is not so much as to cause undue loading and hampering of the desired X-axis motion of the table.

Figure 9:
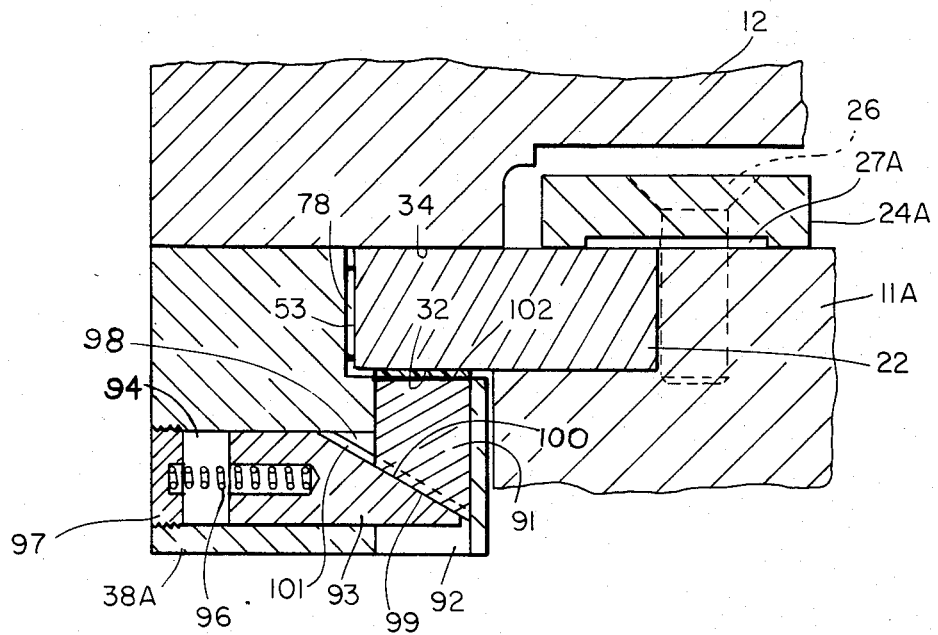
FIG. 9 is a fragmentary cross sectional view of gibs according to the second embodiment, taken at a different location.

To provide the vertical guidance control, and referring to FIG. 9, a gib block 91 is received in a round aperture 92 in the gib frame. Gib wedge block 93 is received in a round aperture 94 in the gib frame. It is spring loaded by a spring 96 in a cavity in this wedge block, just as previously described for the wedge block 81. The spring is seated in a cap 97 threaded into the gib frame 38A at the outer end of the aperture 94. The beveled face 98 of the wedge block provides the backing surface for the beveled face 99 of the gib block 91. The wedge block also has a groove in the beveled face 98 thereof which receives a tongue 100 projecting from face 99 of the gib block 91 to provide a tongue-in-groove relationship. The upper end of the gib block 91 is provided with a non-metallic facing material 102 which bears on the lower guide face 32 of the guide rail 22. The bevel of face 99 is at a self-locking angle relative to the top bearing face of the material 102. This same vertical control gib arrangement is provided at the opposite side of the table in the location of the gib block 67 of the FIG. 4 embodiment, and for the same purpose.

The same kind of gib and way construction as is described for the preferred embodiment of the present invention, is employed for the mounting of the column 16 to the bed 11. The guide rails are at 106 and the guide rail hold-down clamps are at 107. Also, the same arrangement is provided in the mounting of the head to the column. For this purpose, the guide rails are at 108 and the guide rail clamps at 109. The gib block brackets are at 111.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. Self-adjusting gib apparatus for a machine tool comprising:
   a support unit having first and second elongate guide means thereon which extend along parallel lines and are spaced from each other;
   a slide unit slidably mounted on said support unit, said slide unit having first and second gib means thereon,
   said first and second gib means having first and second bearing surface means, respectively, engaging said first and second guide means, respectively,
   said first gib means including backing surface means inclined at a locking angle relative to said first bearing surface means;
   said first gib means including an aperture in a wall thereof, and including a gib block slidably received in said aperture, and slidable therein in a direction toward said first guide means,
   said backing surface being a wall of said aperture facing said first guide means and guidingly engaging and confining said gib block in said slide unit.

2. The apparatus of claim 1 and further comprising:
   means biasing said gib block in said aperture in a direction toward said first guide means.

3. Self-adjusting gib apparatus for a machine tool comprising:
   a support unit having first and second elongate guide means thereon which extend along parallel lines and are spaced from each other;
   a slide unit slidably mounted on said support unit, said slide unit having first and second gib means thereon,
   said first and second gib means having first and second bearing surface means, respectively, engaging said first and second guide means, respectively,
   said first gib means including backing surface means inclined at a locking angle relative to said first bearing surface means;

said first and second guide means including lower and upper guide faces, respectively, of a guide rail secured to said support unit, said first gib means being located below said lower guide face, with the bearing surface means of said first gib means engaging the said lower guide face of said guide rail;

said first gib means including an aperture in a wall thereof, said first gib means including a first gib block slidably received in said aperture, and slidable therein in a direction toward said lower guide face, said bearing surface means of said first gib means being a bearing surface at an end of said first gib block, and said backing surface means including an upwardly facing wall of said aperture.

4. The apparatus of claim 3 wherein:
said second bearing surface is a bottom surface of said slide, slidably supported on said upper guide face to support said slide unit.

5. The apparatus of claim 3 wherein:
the said backing surface wall is disposed at an angle with respect to the said bearing surface of said first gib means, which angle is self-locking.

6. The apparatus of claim 5 wherein:
said bearing surface of said first gib means includes a flat bearing face lying in a first plane,
said backing surface includes a flat backing face lying in a backing plane,
said planes having a self-locking angle between them.

7. The apparatus of claim 6 wherein:
said angle is less than thirteen degrees.

8. The apparatus of claim 3 and further comprising:
third and fourth elongate guide means on said support unit,
third and fourth gib means on said slide unit,
said third and fourth gib means having third and fourth bearing surface means, respectively, engaging said third and fourth guide means, respectively,
said third gib means including backing surface means inclined at a locking angle relative to said third bearing surface means.

9. The apparatus of claim 8 wherein:
said third and fourth guide means include lower and upper guide faces, respectively of a second guide rail secured to said support unit,
said third gib means being located below the lower guide face of said third guide means, with the third bearing surface engaging the lower guide face of said second guide rail.

10. The apparatus of claim 9 wherein:
said third gib means includes an aperture in a wall thereof,
said third gib means includes a second gib block slidably received in said aperture therein, and slidable therein in a direction toward said lower guide face of said third guide means, said third bearing surface means being a bearing surface at an end of said second gib block, and said backing surface means of said third gib means include an upwardly facing wall of said aperture in said third gib means.

11. The apparatus of claim 10 wherein:
said fourth bearing surface is a bottom surface of said slide, slidably supported on said upper guide face of said second guide rail.

12. The apparatus of claim 11 wherein:
said gib blocks are biased to maintain engagement of the bearing surfaces thereof with the respective lower guide faces.

13. The apparatus of claim 12 wherein said gib means include:
springs in said apertures and seated in sockets in said gib blocks, and
gib spring retainers fastened to said slide unit, said springs being seated also on said spring retainers and compressed between said retainers and said gib blocks, whereby said gibs are biased.

14. The apparatus of claim 11 and further comprising:
fifth and sixth elongate guide means on said support unit,
fifth and sixth gib means having fifth and sixth bearing surface means, respectively, engaging said fifth and sixth guide means, respectively,
said fifth gib means including backing surface means inclined at a locking angle relative to said fifth bearing surface means.

15. The apparatus of claim 14 wherein:
said sixth gib means are fixed on said slide unit.

16. The apparatus of claim 15 wherein:
said fifth bearing surface means are biased to urge said fifth bearing surface means constantly against said fifth guide means, whereby zero clearance is maintained between said sixth gib means and said sixth guide means.

17. The apparatus of claim 15 and further comprising:
a plurality of additional gib means like said first, third and fifth gib means and spaced along said slide in the direction of extension of said guide means,
the additional gib means like said first gib means having bearing surface means engaging said first guide means,
the additional gib means like said third gib means having bearing surface means engaging said third guide means,
the additional gib means like said fifth gib means having bearing surface means engaging said fifth guide means,
said first, third, fifth and additional gib means having means biasing the bearing surfaces thereof against their respective guide means to maintain zero clearance between all of said gib means and their respective guide means.

* * * * *